United States Patent
Blaine

[15] 3,687,527
[45] Aug. 29, 1972

[54] METHOD AND APPARATUS FOR EXERCISING THE OCULOMOTOR ACCOMMODATION MECHANISM OF THE EYES

[72] Inventor: Harlan P. Blaine, 103 Catron St. Apartment 46, Santa Fe, N. Mex. 87501

[22] Filed: Dec. 21, 1970

[21] Appl. No.: 100,124

[52] U.S. Cl. .................... 351/39, 128/76.5, 351/2, 351/29
[51] Int. Cl. ........................................... A61b 3/00
[58] Field of Search ............. 351/2, 29, 39; 128/76.5

[56] References Cited

UNITED STATES PATENTS 2,322,878   6/1943   Peck et al. ................. 351/29
3,498,699   3/1970   Wilkinson .................. 351/29
2,831,481   4/1958   Radin ......................... 351/2

Primary Examiner—David Schonberg
Assistant Examiner—Paul A. Sacher
Attorney—Head & Johnson

[57] ABSTRACT

A method and apparatus for exercising the oculomotor accommodation mechanism of the human eye, the apparatus having a frame rotatably supporting spaced lenses and adaptable to be placed before the eye of the user so that the user sees through the lenses to perceive objects there beyond, each lens having a curvature in a first meridian and a curvature in a second meridian perpendicular to the first, the curvatures in the two meridians differing by a power in the range of 0.12 to 8.0 diopters.

8 Claims, 6 Drawing Figures

3,687,527

INVENTOR.
HARLAN P. BLAINE

BY Head & Johnson

ATTORNEYS

PATENTED AUG 29 1972 3,687,527

INVENTOR.
HARLAN P. BLAINE
BY Head & Johnson
ATTORNEYS

//3,687,527

METHOD AND APPARATUS FOR EXERCISING THE OCULOMOTOR ACCOMMODATION MECHANISM OF THE EYES

BACKGROUND, SUMMARY AND OBJECTS OF THE INVENTION

The human eye includes a crystalline lens through which light passes, the function of the lens being to focus the light on the retina. The optic nerves in the retina transform the light stimulus into nerve stimulus so that the perception of vision is completed in the brain. In order to adjust focusing of objects on the retina, the eye has means of varying the length of focus between near and distant objects, that is, the eye has a mechanism of adjustment or accommodation for different distances. While the exact mechanism of accommodation is the subject of dispute, there seems to be little doubt but that it is chiefly effective by a change in the focal length of the cyrstalline lens. Some believe that this change in curvature takes place primarily on the anterior surface of the crystalline lens. In any event, the change is caused by an alteration of curvature of the crystalline lens. The exact mechanism of change of the crystalline lens is also not precisely known, however, it appears that in the normal condition the crystalline lens is flattened anteriorly by the pressure of the anterior layer of the eye capsule. During accommodation, the radiating fibers of the ciliary muscles pull the ciliary processes forward, thus relieving the tension of the anterior layer of the capsule, and the crystalline lens at once bulges forward by its elasticity. In any event, regardless of the anatomical means by which the curvature or focal length of the crystalline lens changes, it is universally agreed among opthalmologists and optometrists that healthy functioning of the crystalline lens system is imperative for effective vision. This invention provides a means for exercising the oculomotor accommodation system, and more particularly, the crystal lens system of the human eye. Such exercise serves to increase the nerve energy to the eye, thus stimulating the interior of the eyeball in the same manner that the use of weights or other apparatus can be made to exercise the arms or legs to make them strong and healthy.

It is therefore a primary object of this invention to provide a method and apparatus for exercising the oculomotor accommodation mechanism of the human eye and particularly the crystalline lens system.

A particular object of this invention is to provide an apparatus for exercising the crystalline lens of the human eye including a frame for rotatably supporting a lens and adaptable to be placed before the eye of the user such that the user sees through the lens to perceive objects there beyond including a lens rotatably supported in the frame having a curvature in a first meridian and a curvature in the second meridian perpendicular to the first, the curvatures in the two meridians differing by a power in the range of 0.12 to 8.0 diopters.

Another particular object of this invention is to provide a method of exercising the oculomotor accommodation mechanism and particularly the crystalline lens system of the human eye comprising rotating a cross cylinder lens before the eye through which the subject perceives objects therebeyond, for a period of about 3 to 15 minutes or longer, repeating such treatment two or three times each day until the maximum effectiveness of the treatment has been achieved.

These and other objects will be fulfilled by the apparatus and method of treatment now to be described in the following specification and claims, taken in conjunction with the attached drawings.

DESCRIPTION OF THE VIEWS

DETAILED DESCRIPTION

Figure 2:
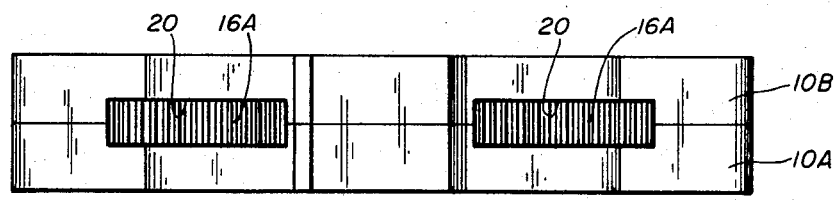
FIG. 2 is a top view of the apparatus of FIG. 1.
Figure 1:
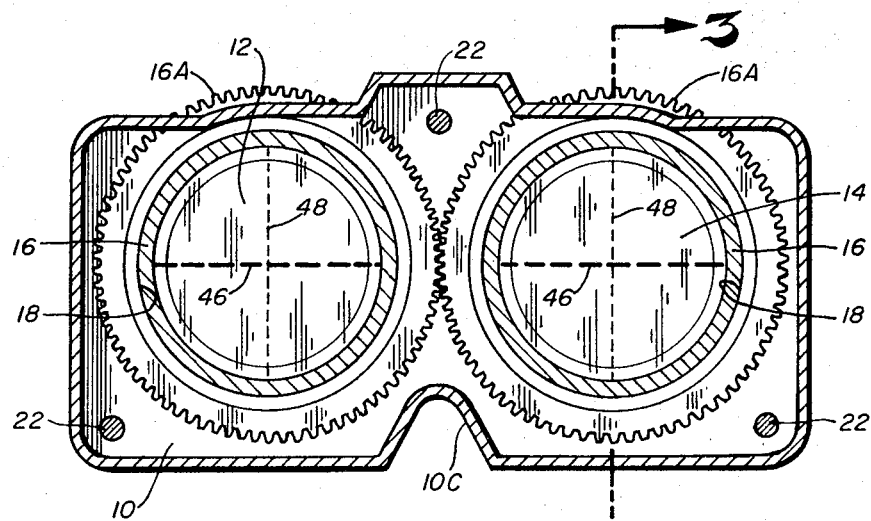
FIG. 1 is a front view of an embodiment of the apparatus of this invention.
Figure 3:
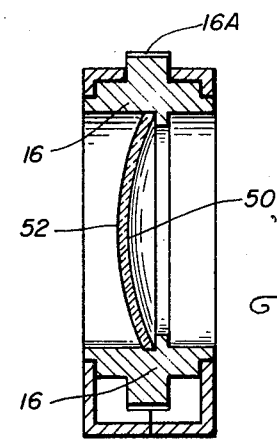
FIG. 3 is a cross-sectional view taken along the line 3—3 of FIG. 1.

Referring to the drawings and first to FIG. 1, an embodiment for the manual utilization of the principles of this invention is shown. A frame 10 rotatably supports lenses 12 and 14. The frame includes a first front portion 10A and a back portion 10B (see FIG. 2) which rotatably receives the lens there between. As shown best in FIG. 3, the lenses are each positioned in a lens holder 16. Openings 18 in the front and back portions of the frame rotatably receive the lens holders 16.

The exterior periphery 16A of the lens holders is threaded and the lenses are spaced apart such that the threaded portions mesh; thus, as one lens holder is rotated the other is simultaneously rotated in the opposite direction.

Frame 10 is configured such that openings 20 are provided in the top (see FIG. 2) through which a portion of the peripheral surfaces 16A of the lens holders extend. This enables the user to place his fingers on the exposed portion for the rotation of the lens.

Frame 10 includes a nose receiving recess 10C so that the frame may be held in front of the eyes by the user for visual perception of objects through the lens. The frame portions 10A and 10B are held together such as by means of screws 22. While the dimensions of the apparatus may vary considerably in a typical embodiment lenses 12 and 14 may be approximately 38 millimeters in diameter with the center of the lenses being placed approximately 62 millimeters apart. Preferably the center of the lenses should have the same measurement as the innerpupillary spacing of the eyes of the user, although unless the innerpupillary distance is unusually small or unusually large a frame in which the center of the lenses are approximately 62 millimeters apart is satisfactory.

Figure 4:
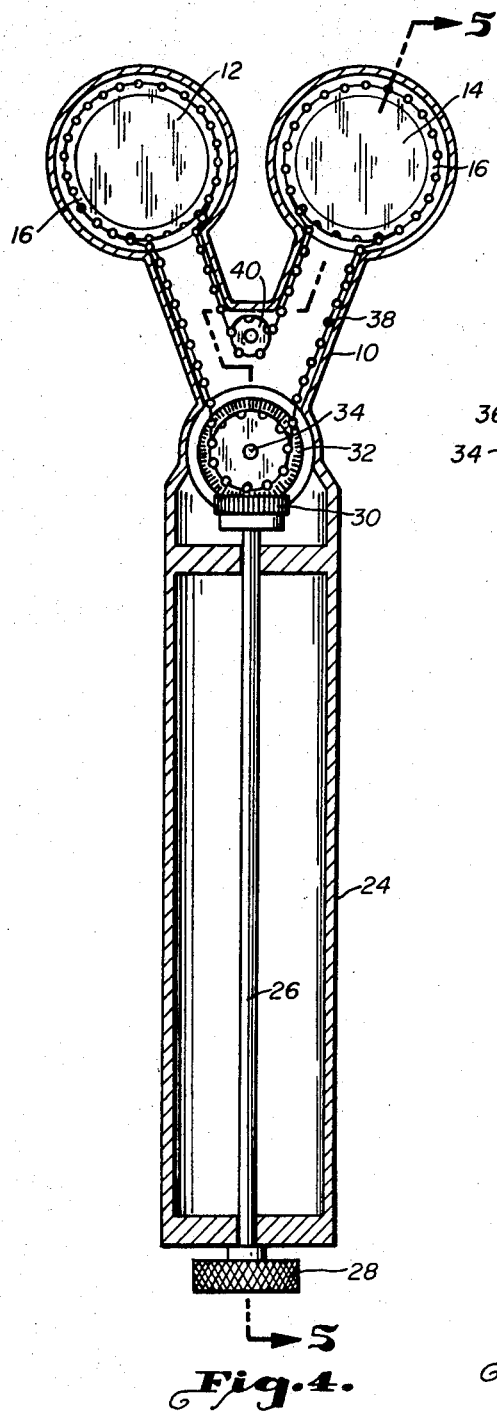
FIG. 4 is a front view, shown cut away, of an alternate embodiment of an apparatus of this invention.
Figure 5:
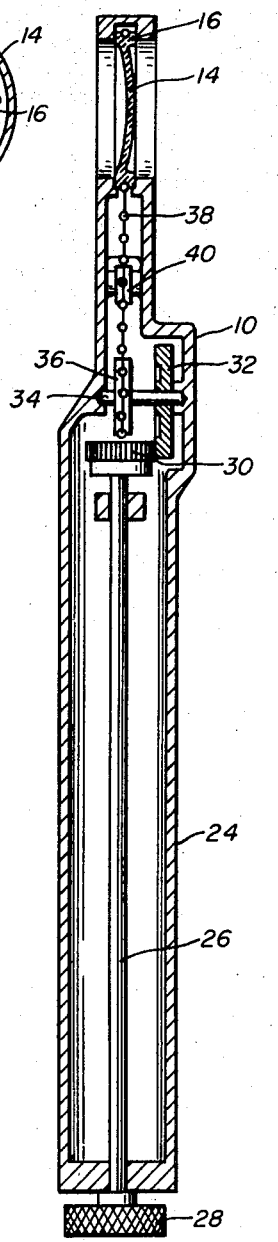
FIG. 5 is a cross-sectional view taken along the line 5—5 of FIG. 4.

FIGS. 4 and 5 show an alternate arrangement in which the frame 10 has a downward extending handle portion 24. A shaft 26 received in the handle portion is turned by a knob 28 at the lower end thereof. Shaft 26 has a drive gear 30 affixed at the upper end which meshes with a gear 32 at right angles thereto rotated about a shaft 34. Affixed to shaft 34 is a drive pulley 36 having a chain 38 thereabout. The chain 38 loops around the lens holders 16 and about an idler pulley 40. When knob 28 is turned chain 38 is moved, rotating the lenses 12 and 14.

Figure 6:
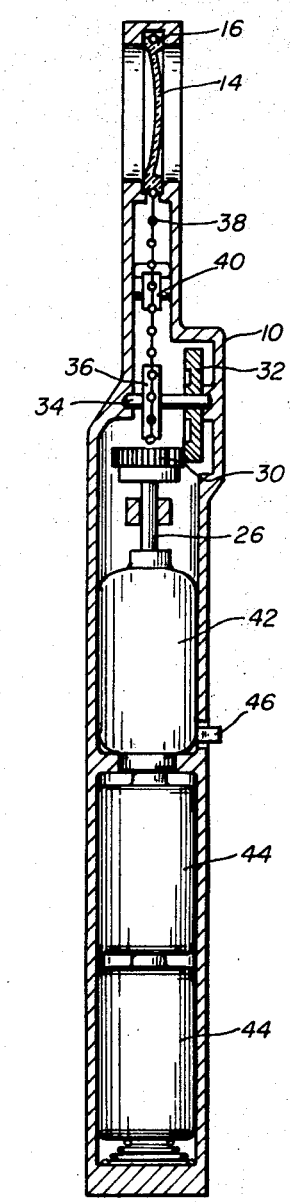
FIG. 6 is a cross-sectional view of an additional alternate embodiment of the invention utilizing a battery powered motor for rotating the lens.

FIG. 6 shows an alternate, motorized arrangement of the embodiment of FIGS. 4 and 5. Affixed to shaft 26 is a motor 42 supported in the handle 24. In addition, batteries 44 are contained in the handle and electrically connected to the motor 42 through a switch 46. When switch 46 is turned on, motor 42 is energized to rotate the lenses.

The configuration of lenses 12 and 14 is essential to the invention. Each lens 12 and 14 is ground such that it has a curvature in a first meridian (indicated by heavy dotted line 46 of FIG. 1) of a preselected focal length. A second meridian, (indicated by light dotted line 48) has a curvature providing a preselected focal length. The meridians 46 and 48 are perpendicular to each other. The focal length of the two perpendicular meridians 46 and 48 are different from each other by a power in the range of 0.12 to 8.0 diopters.

A typical and preferred arrangement is that in which the first meridian 46 has a curvature providing a power of +1 diopter while the second meridian 48 has a curvature providing power of −1 diopter, that is, wherein the difference between the powers of the two perpendicular meridians is 2 diopters.

The grinding of lenses to achieve the above described configuration may be accomplished in a variety of ways. In the simplest arrangement the lens is ground such that the inner or concave surface 50 (see FIG. 3) has a curvature providing a focal length of −1 diopter, while the exterior or convex surface 52 of the lens is a cylinder lens having a curvature providing a power of +2 diopters. This arrangement means that in one meridian the summation of the curvatures producing a +1 diopter and in the meridian perpendicular thereto the summation of the curvatures produces a power of −1 diopter.

The lens may also be ground such that the lens has a plus cylinder on one surface and a minus cylinder on the other at right angles to the first, this being known as a cross cylinder. Any lens that produces a spherocylinder or cross cylinder effect having a difference in power in different meridians is within the broadest concept of the invention.

Such lens configurations cause distortion of the appearance of objects. The eye, to accommodate or adjust for such distortion, exerts tonal energy to the oculomotor accommodation mechanism of the eye, and particularly the crystalline lens system. As the lens is rotated total energy is continually required to make, or attempt to make, accommodation for the continually changing distortion. This causes the configuration of the crystalline lens to undergo continuous change. Thus the user, rotating the lens as above described in front of his eye, achieves the effect of massaging or exercising the crystalline lens and the oculomotor accommodation muscles of the eye associated therewith. Such exercising has the beneficial result as achieved by the exercising of any muscle of the body. That is, exercise increases the flow of energy sustaining fluids to the exercised area to achieve all the benefits of healthy, well exercised muscles. As the crystalline lens and the muscles of the eye associated therewith are exercised, the health of these elements increases and the impediments to normal vision are reduced.

While no curative claims are made it is believed that exercising the eye accomplished by the apparatus and method of this invention will prove to be helpful in reducing those conditions which lead to cataracts, presbyopia, and lenticular astigmatism, and will assist in reducing color blindness, myopia, hyperopia, and astigmatism.

It can be seen that the apparatus and the method of treatment including the use of such apparatus may be practiced on only one eye using one lens rotated in front of the eye. In the preferred arrangement, however, both eyes are preferably treated simultaneously. The treatment of exercising of the eyes is best practiced by rotating the lenses slowly, either manually or by an energized mechanism such as shown in FIG. 6, for a period of about 3 to 15 minutes or more. Such exercising periods may be repeated every 3 to 4 hours during the waking hours of the user or, that is, two or three times per day. The treatments can be continued indefinitely or at least until further improvement of the vision stops. The treatments are preferably carried out in normal light, that is, without increased light intensity.

While the invention has been described with a certain degree of particularity, it is manifest that many changes may be made in the details of construction and the steps of the method, without departing from the spirit and scope of this disclosure. It is understood that the invention is not limited to the embodiments set forth herein for purposes of exemplification, but is to be limited only by the scope of the attached claim or claims, including the full range of equivalency to which each step or element thereof is entitled. What is claimed is:

1. A method of exercising the oculomotor accommodation mechanism of the eye comprising the steps of:

positioning a cylinder lens near the eye so that vision is achieved through the lens of objects beyond, the lens having a curvature in the first meridian and a curvature in the second meridian perpendicular to the first, the curvatures in the two meridians differing by a power in the range of 0.12 to 8.0 diopters; and rotating the lens.

2. A method of exercising the oculomotor accommodation mechanism of the eye according to claim 1 including rotating the lens in front of the eye for a period of about 3 to 15 minutes, and repeating such period at about 3 to 4 hour intervals.

3. A method of exercising the oculomotor accomodation mechanism of the eye according to claim 1 wherein the lens has a curvature in one meridian having the power of about +1 diopter and a curvature in the second meridian having the power of about −1 diopter.

4. A method of exercising the oculomotor accomodation mechanism of the eye according to claim 1 wherein the lens has an inner spherical curvature of about −1 diopter power and an outer cylindrical curvature of about +2 diopter power.

5. A method of exercising the oculomotor accomodation mechanism of the eyes comprising the steps of:

positioning a first cylindrical lens near one eye and a second cylindrical lens near the other eye so that vision is achieved through the lenses of objects beyond, each lens having a curvature in the first meridian and a curvature in the second meridian perpendicular to the first, the curvatures of the two meridians differing by power in a range of 0.12 to 8.0 diopter; and simultaneously rotating the lenses.

6. A method of exercising the oculomotor accomodation mechanism of the eyes according to claim 1 including simultaneously rotating the lenses in front of the eyes for a period of about 3 to 15 minutes, and repeating such periods at about 3 to 4 hour intervals.

7. A method of exercising the oculomotor accommodation mechanism of the eyes according to claim 5 wherein each lens has a curvature in one meridian having a power of about +1 diopter and a curvature of the second meridian having a power of about −1 diopter.

8. A method of exercising the oculomotor accommodation mechanism of the eyes according to claim 5 wherein each lens has an inner spherical curvature of about −1 diopter power and an outer cylindrical curvature of about +2 diopter power.

* * * * *